United States Patent [19]

de Haan

[11] 3,962,721
[45] June 8, 1976

[54] APPARATUS FOR READING A DISC-SHAPED RECORD CARRIER WITH VIDEO LUMINANCE AND CHROMINANCE INFORMATION

[75] Inventor: Maarten Rutger de Haan, Eindhoven, Netherlands

[73] Assignee: U.S. Philips Corporation, New York, N.Y.

[22] Filed: Dec. 6, 1974

[21] Appl. No.: 530,276

[30] Foreign Application Priority Data
Oct. 7, 1974 Netherlands............... 7413162

[52] U.S. Cl. ................ 358/4; 178/6.6 R; 178/6.7 A; 179/100.3 V
[51] Int. Cl.² ................ H04N 5/84; G11B 7/00
[58] Field of Search ............. 179/100.3 V, 100.3 B, 179/100.41 L; 178/6.7 A, 6.6 R; 250/201, 202, 203, 208; 358/8, 9, 4, 12

[56] References Cited
UNITED STATES PATENTS

| 3,207,904 | 9/1965 | Heinz | 250/208 |
|---|---|---|---|
| 3,634,689 | 1/1972 | Ejiri | 250/202 X |
| 3,657,547 | 4/1972 | Mansfield | 250/208 |
| 3,679,307 | 7/1972 | Zoot | 250/208 |
| 3,854,015 | 12/1974 | Janssen | 179/100.3 V |

OTHER PUBLICATIONS
"Signal Processing in the Philips 'VLP' System" By W. den Bussche et al., Philips Tech. Rev. 33, pp. 181-185, 1973, No. 7.
"An Experimental Optical Videodisc Playback System" By G. Hrbek, Journal of the SMPTE, vol. 83, July 1974.

Primary Examiner—Bernard Konick
Assistant Examiner—Alan Faber
Attorney, Agent, or Firm—Frank R. Trifari; Simon L. Cohen

[57] ABSTRACT

An apparatus for reading a disc-shaped record carrier on which signals are recorded in parallel tracks in optically coded form. The signal is read with the aid of a beam of radiation, which after interaction with the record carrier impinges on two detectors offset with respect to each other in a direction parallel to the image of the track direction of the record carrier. A first combination circuit supplies the difference of the output signals of said read detectors to a first signal processing channel, which processes the part of comparatively high frequency of the frequency spectrum of the recorded signal. A second combination signal supplies the sum of the output signals of said read detectors to a second processing channel, which processes the part of comparatively low frequency of the frequency spectrum of the recorded signal.

4 Claims, 6 Drawing Figures

APPARATUS FOR READING A DISC-SHAPED RECORD CARRIER WITH VIDEO LUMINANCE AND CHROMINANCE INFORMATION

The invention relates to an apparatus for reading a disc-shaped record carrier in which signals are recorded in optically coded form in parallel extending tracks, which apparatus comprises a radiation source for emitting a radiation beam and a detector unit for converting the information which is contained in said radiation beam after interaction with the record carrier into an electric signal, which detector unit comprises two read detectors, which occupy positions which are offset relative to each other in a direction parallel to the image of the track direction of the record carrier on the detector unit, and a first combination circuit for subtracting the signals supplied by the two read detectors from each other, which first combination circuit is connected to a first signal processing channel for processing the information contained in the output signal of said first combination circuit.

Such an apparatus is described in the German Pat. App. No. 2,342,906 which has been laid open for public inspection. The apparatus described in said Patent Application is employed for reading record carriers on which the information is recorded in a relief pattern, which for example consists of a sequence of recesses and intermediate areas in the surface of a record carrier. This type of record carriers is most suited for mass production, because said record carriers can be manufactured rapidly and inexpensively by means of pressing techniques.

In an embodiment of the read apparatus for such a record carrier shown in said German Patent Application a detector unit is employed which consists of four read detectors. Two of said read detectors are disposed symmetrically relative to a plane perpendicular to the record carrier and parallel to the track direction and they are used for measuring the radial position of the scanning spot on the record carrier relative to the track in order to obtain a control signal for the radial tracking system. The two other read detectors are disposed symmetrically relative to a plane which is both perpendicular to the record carrier and perpendicular to the track direction and they are used for reading the information which is recorded on the record carrier.

Reading is effected by determining the difference between the amounts of light incident at the two read detectors with the aid of a differential amplifier, so-called differential reading. Said method of reading is based on the insight that when the scanning spot produced by the road beam of radiation is completely situated at a recess or completely at an intermediate area, the two read detectors receive the same amount of light and the output signal of the differential amplifier is consequently zero. When said scanning spot hits the transition between a recess and an intermediate area, this is no longer the case and the amounts of light received by the two read detectors will differ as a result of diffraction of the beam. In this manner the transitions of the recesses and the intermediate areas are detected, thus enabling the recorded signal to be reproduced.

It has been found that below a certain limit frequency whose magnitude varies with the read diameter the sensitivity of said reading system decreases with decreasing frequency. The frequency characteristic of this system is consequently not flat at lower frequencies, but has a certain roll-off in that region. As a result of this, said part of the frequency spectrum of comparatively low frequency cannot readily be used for signal transmission, so that the available frequency band for signal transmission is limited. It will be obvious that this may be a limitation especially for the transmission of a video signal, when a large band width is desirable.

It is an object of the invention to mitigate said drawback and the invention is characterized in that the detector unit comprises a second combination circuit, which adds the signals supplied by the two read detectors and is connected to a second signal processing channel, the first signal processing channel being equipped to process signal components which occupy a part of the frequency spectrum of comparatively high frequency and the second signal processing channel being equipped to process signal components which occupy a part of said frequency spectrum of comparatively low frequency.

The addition of the second combination circuit as it were introduces a second read method. The addition of the signals supplied by the two detectors basically has no other effect than the detection of the full information contained in the beam which is used for reading. Said method of reading is known per se and an embodiment thereof is for example described in U.S. Pat. Application Ser. No. 344,866, filed Mar. 26, 1973 and now abandoned in favor of U.S. Ser. No. 536,161, filed Dec. 24, 1974. Said method is readily suitable for reading the information which is recorded on the record carrier. The transfer function of said read method in respect of the part of comparatively high frequency substantially corresponds to the transfer function of the first-mentioned read method. However, in the part of the transfer function of comparatively low frequency said read method does not have the drawback of the first-mentioned read method, but on the contrary it has a comparatively flat characteristic. This means that by means of this read method signal components which are contained in the part of comparatively low frequency of the frequency spectrum can be read.

The step according to the invention thus provides a read method which combines the advantages of the two read methods and which allows a frequency band for the storage of the desired signals to be used which is essentially not limited at the low frequency end and which extends down to zero frequency. These and other advantages of the apparatus according to the invention will be described in more detail with reference to the Figures in which FIG. 1 schematically shows an embodiment of the apparatus according to the invention.

Figure 5:
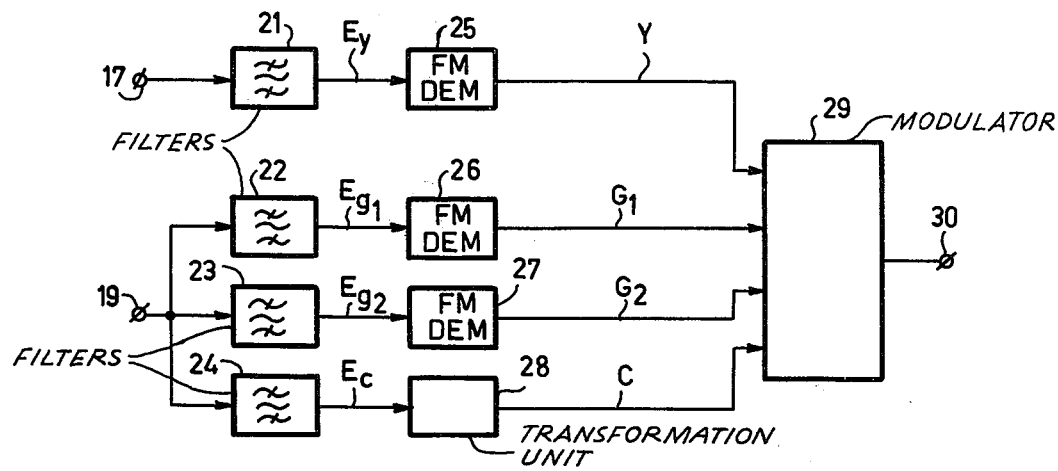

FIG. 5 by way of example shows the two signal processing channels, and

Figure 6:
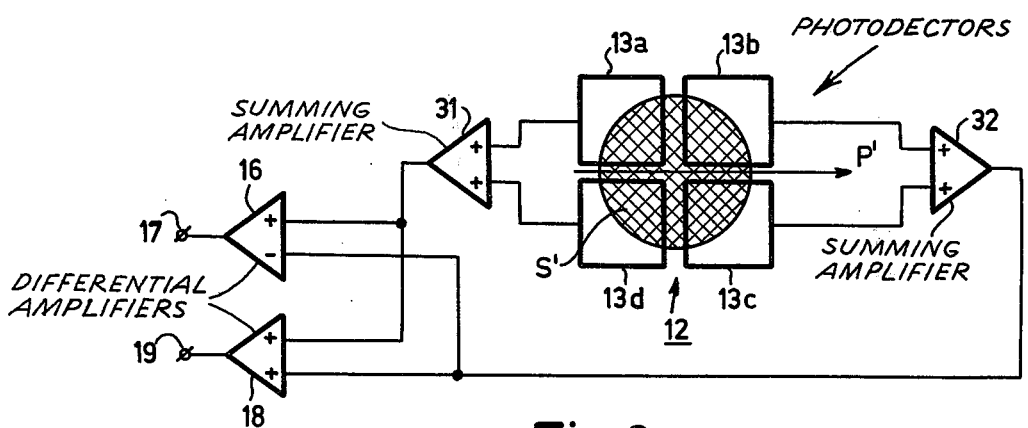

FIG. 6 shows an alternative arrangement of the detector unit.

Figure 1:
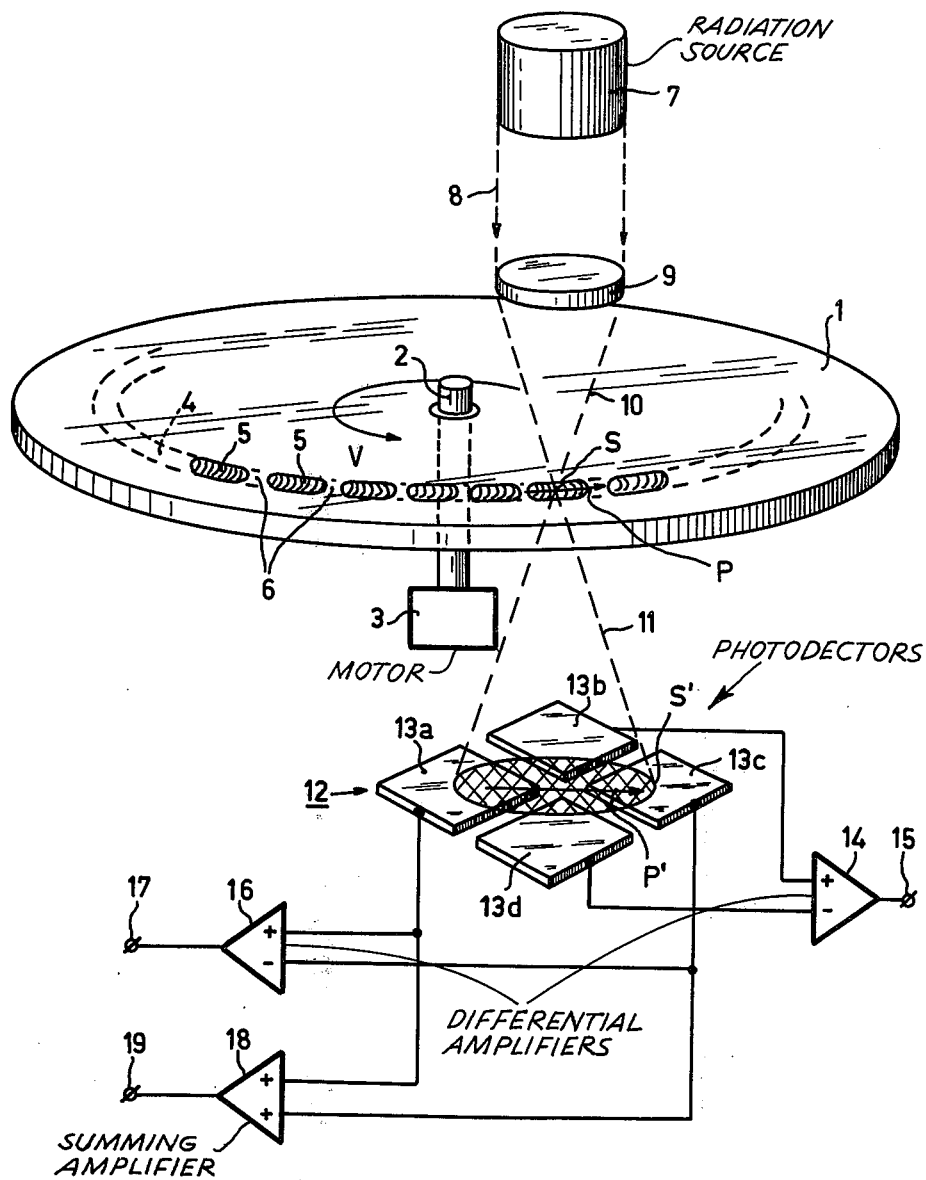

The disc-shaped record carrier 1 in FIG. 1 is rotated in a direction V by means of a motor 3 and a spindle 2 which extends through a central hole of the record carrier 1. On said record carrier information is recorded in tangentially extending tracks 4. In this respect the recording and reading of a video signal is first of all thought of, which signal consists of luminance information, chrominance information and sound information. Said information may be recorded both in a single spiral track and in a multiplicity of concentric tracks. In the embodiment shown the information is recorded in the form of recesses 5 in the surface of the record carrier, so that the track 4 consists of a sequence of recesses 5 and intermediate areas 6.

The information which is recorded in said record carrier 1 is read with the aid of an optical read system, which first of all comprises a radiation source 7. Said radiation source 7 emits a beam 8 which by means a lens 9 is converted into a converging beam 10. Said beam 10 hits the record carrier 1 in point S, which is called the scanning spot, and interacts with the information at the location of said scanning spot. S. Eventually, the radiation beam 11 which is modulated by said information hits a detector unit 12, on which the scanning spot S is thus imaged as a radiation spot S'.

The detector unit 12, in accordance with the detector unit shown in the said German Pat. Application 2,342,906, consists of four read detectors 13a, 13b, 13c and 13d which together occupy a square surface area. The two read detectors 13a and 13c are then disposed symmetrically relative to a plane which is perpendicular to the imaged track direction p', while the two read detectors 13b and 13d are disposed symmetrically relative to a plane which is perpendicular to said first-mentioned plane of symmetry. As is described in said German Patent Specification the read detectors 13b and 13d may be used for obtaining information about the radial position of the scanning spot S on the record carrier. As long as the scanning spot S correctly follows the track 4 the amounts of light received by the read detectors 13b and 13d are equal. If a deviation occurs from the radial position of the scanning spot S, the image S' is moved perpendicularly to the direction p' owing to diffraction phenomena, so that the amounts of light received by the two read detectors differ. By determining this difference with the aid of a differential amplifier 14 a signal is obtained at a terminal 15, which is suited to serve as a control signal for a radial tracking system, not shown, which controls the radial position of the scanning spot S.

Figure 2:
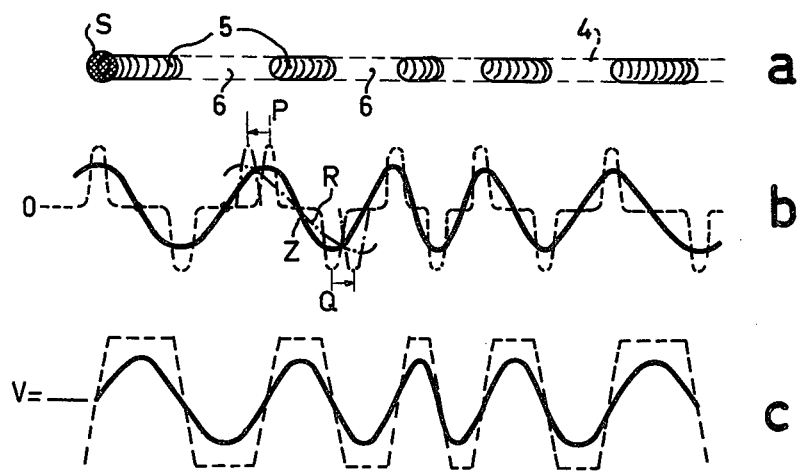
FIG. 2 shows the associated signal waveforms.

The information in the track 4 of the record carrier is read in accordance with the said German Patent Application with the aid of a differential amplifier 16 whose two inputs are connected to the read detectors 13a and 13c and which consequently supplies a signal at its output terminal 17 which is proportional to the difference between the amounts of light received by the two read detectors. The operation of said read method is further explained with reference to FIG. 2. FIG. 2a shows a part of the track 4, with recesses 5 and intermediate areas 6, which are scanned by the scanning spot 5. When said scanning spot S is completely projected on a recess or completely on an intermediate area the two read detectors receive the same amount of light and the output signal of the differential amplifier 16 is zero. However, as soon as the scanning spot impinges on a transition between a recess and an intermediate area there will be a difference between the amounts of light received by the two read detectors 13a and 13c owing to diffraction, and the differential amplifier 16 supplies a non-zero output signal. The pattern shown in FIG. 2a in theory yields an output signal of the differential amplifier 16 in accordance with the signal which is indicated by the dotted line in FIG. 2b. However, since the bandwidth of the transmission system is limited, the actual output signal of said differential amplifier will have a variation as indicated by the uninterrupted line.

Figure 3:
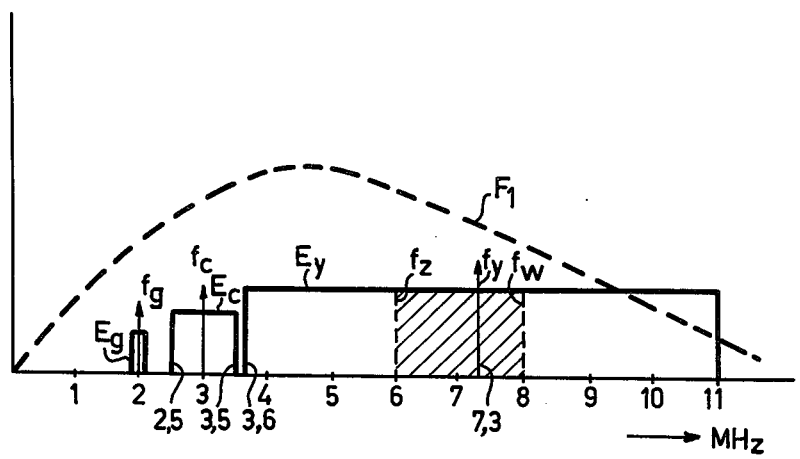
FIGS. 3 and 4 show two frequency spectra.

The transfer function $F_1$ of a read system which is based on said method of reading is shown in FIG. 3. Said transfer function $F_1$ obviously has a limited bandwidth and consequently exhibits a roll-off at increasing frequency above a specific frequency of for example approximately 5 MHz. Moreover, said transfer function exhibits a roll-off at decreasing frequency below a certain frequency of for example approx. 4 MHz. This means that only a limited part of the total frequency band is suited for signal transmission. The Figure shows by way of example in which manner the various signal components of a color television signal can be positioned within said transfer function.

The luminance signal is recorded as a frequency modulation of a carrier wave $f_y$. It is assumed that said modulated carrier wave has a frequency swing from $f_z$ = 6 MHz (synchronizing pulse) to $f_w$ = 8 MHz (maximum white) and that as maximum bandwidth of the luminance signal 3 MHz is selected, so that the first-order side bands of said modulated carrier wave at one side have 3.6 MHz, i.e. 6.6. MHz (maximum black) minus 3 MHz, as limit frequency, and at the other side 11 MHz. Thus, the luminance information in total covers the frequency band $E_y$ from 3.6MHz to 11 MHz. The chrominance information is recorded as a modulation of a carrier wave $f_c$ = 3 MHz and covers the frequency band $E_c$ from 2.5 MHz to 3.5 MHz. The shape of said chrominance signal and the method of modulation are irrelevant in this respect, so that these aspects will not be discussed any further. Finally, a sound signal is modulated on a carrier wave $f_g$ = 2 MHz, resulting in the frequency band $E_g$.

Owing to the roll-off of the transfer function $F_1$ at lower frequencies the frequency band below 1.5 to 2 MHz is less suitable for signal transmission, because at these low frequencies the signal-noise ratio has deteriorated too far. It will be evident that this imposes limitations on the bandwidth available for the various signal components and the choice of the various carrier frequencies.

The invention overcomes this by means of the addition to the known read system shown in FIG. 1. According to the invention the signals from the read detectors 13a and 13c are also applied to an amplifier 18, which supplies the sum of these two signals at a terminal 19. This step results in a read method, known per se, described in the previously mentioned U.S. Patent application, in which reading is effected with only one read detector. Basically, it makes no difference whether reading is effected with one read detector, or with two read detectors whose output signals are added.

The signal waveform obtained by means of said method of reading is shown in FIG. 2c, again related to the track pattern shown in FIG. 2a. The amount of light received by a read detector will differ depending on whether the scanning spot impinges on a recess 5 or an intermediate area 6, which results in a signal variation as represented by the dashed line in FIG. 2c. Here, said a.c. signal is superimposed on average d.c. value $V=$, which corresponds to the average incident light level. When said signal is amplified using a.c. coupling, it is obvious that an a.c. signal is obtained which is symmetrical relative to zero. Owing to the bandwidth limitation the actual signal will be as represented by the continuous line in FIG. 2c.

Figure 4:
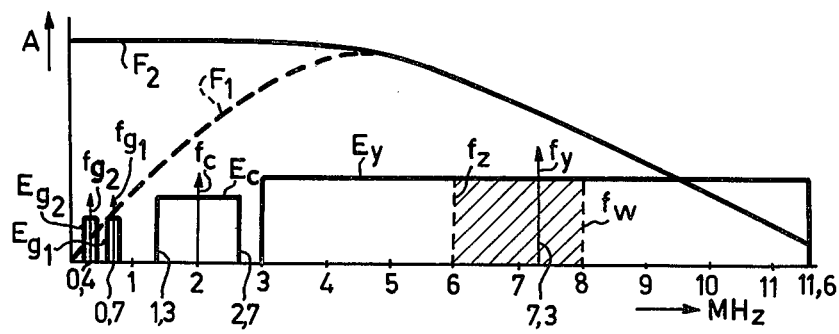

The signal thus obtained again contains the full information recorded on the record carrier in analogy to the read method described hereinbefore. The transfer function $F_2$ of a read system based on this method of reading, however, differs from the transfer function $F_1$ of the first system described and is shown in FIG. 4. To facilitate a comparison of the two transmission systems the transfer function $F_1$ is shown again in said Figure.

The high-frequency parts (above approx. 5 MHz) of the two transfer functions $F_1$ and $F_2$ are substantially identical. However, in the low-frequency part there is a substantial and basic difference. The transfer function $F_2$ has no roll-off at lower frequencies but is substantially flat down to zero frequency. This means that for the last-mentioned method of reading the frequency band which is available for signal transmission is substantially unlimited at the low-frequency end.

To clarify the step according to the invention an example of positioning the various signal components of a color television signal is shown in the frequency spectrum of FIG. 4 in analogy with FIG. 3, and FIG. 5 shows the processing of said signal components. The luminance signal is again frequency modulated on a carrier wave $f_y$ of 7.3 MHz, which corresponds to grey level, the same frequency swing being selected as in FIG. 3, namely from $f_z = 6$ MHz (synchronizing pulse) to $f_w = 8$ MHz (maximum white). However, for the first-order side band a frequency spacing of 3.6 MHz is now reserved relative to black level (6.6 MHz), so that said lower side band extends to 3 MHz. The bandwidth of the eventually reproduced luminance signal is thus extended substantially, viz. 3.6 − 30= 0.6 MHz.

By means of a band-pass filter 21 (see FIG. 5) said luminance signal is extracted from the signal which is available at terminal 17. Terminal 17 in this case is the output of the differential amplifier 16 (FIG. 1) and consequently provides a signal which is derived from the difference between the amounts of light incident at the two read detectors 13a and 13c. Said extracted luminance signal $E_y$ is demodulated with the aid of the demodulator circuit 25.

The chrominance signal $E_c$ (FIG. 4) as modulation of a carrier wave $f_c = 2$ MHz covers a frequency band which extends from 1.3 to 2.7 MHz. Consequently, said chrominance signal also has a larger bandwidth than in the situation of FIG. 3. Finally, two sound signals $E_{g_1}$ and $E_{g_2}$ are recorded on two carrier waves $f_{g_1} = 0.7$ MHz and $f_{g_2} = 0.4$ MHz. These signal components $E_c$, $E_{g_1}$ and $E_{g_2}$ are located in a frequency range which can no longer be transmitted correctly using the first-mentioned read system with transfer function $F_1$, because said transfer function $F_1$ already has a substantial roll-off in this frequency range. Recording of such signals is described in U.S. Pat. No. 3,893,163.

Said signal components $E_{g_1}$, $E_{g_2}$ and $E_c$ are therefore extracted from the signal which is available at terminal 19 with the aid of band filters 22, 23 and 24 (FIG. 5). Said terminal 19 is the output of amplifier 18 (FIG. 1) and supplies as signal the sum of the signals supplied by the two read detectors 13a and 13c, for which the transfer function $F_2$ applies which is readily usable in the relevant frequency range. The extracted sound signals $E_{g_1}$ and $E_{g_2}$ are demodulated with the aid of FM demodulators 26 and 27 (FIG. 5) which supply the signals $G_1$ and $G_2$ at their respective outputs. The chrominance signal $E_c$ is supplied to a transformation unit 28, which transforms said chrominance signal $E_c$ to a chrominance signal C which is suited for reproduction by a standard color television receiver. It is obvious that the embodiment of said unit 28 depends on the manner in which the color signal is coded, for which many modifications are known. However, the method of coding is immaterial for the principle of the invention. The signals Y, $G_1$, $G_2$ and C are finally applied to a circuit 29, in which said signals are for example modulated on a high-frequency carrier wave, so that a HF television signal is available at output terminal 30, which may be applied directly to the aerial input of a television receiver.

By means of the steps according to the invention the frequency band available for signal transmission is extended substantially, while maintaining the advantages of the first-mentioned read system. Both for the luminance signal $E_y$ and the chrominance signal $E_c$ a wider frequency band is available. An advantage of the use of the first-mentioned read system is the fact that with this method of reading the frequency modulated luminance signal is less susceptible to interference owing to the occurrence of cross-products with the other signal components, especially when said other signal components are added to said frequency modulated luminance signal as a pulse-width modulation. This can be illustrated simple by means of FIG. 2a. A pulse width modulation in said frequency modulated luminance signal manifests itself as an oppositely directed shift of two successive signal pulses, which means that the two signal pulses in FIG. 2b, which denote the two transitions from a recess 5 to an intermediate area 6 are shifted in opposite directions, as is illustrated by means of the pulses P and Q (dash-dot lines). The resulting signal is denoted by the dash-dot line R. When the luminance signal is frequency modulated the applied signal is limited, so that a pulse-shaped signal is obtained, which means that as information solely the position of zero crossings of the applied signal is used. However, FIG. 2b shows that initially the position of the zero crossing Z is not influenced by the pulse-width modulation, so that said pulse-width modulation initially does not influence the limited frequency modulated luminance signal in the case of said differential read method in accordance with the first read system.

FIG. 6 shows an alternative arrangement of the detector unit 12. The read detectors 13a and 13b are then disposed in line parallel to the imaged track direction P' and the read detectors 13d and 13c are also disposed in this manner. To obtain the desired two read methods the signals of the read detectors 13a and 13d may first of all be added by means of an amplifier 31 and the signals of the read detectors 13b and 13c by means of amplifier 32. The output signals of said two amplifiers 31 and 32 may then be applied to the amplifiers 16 and 18 at whose outputs 17 and 19 the desired signals are then available.

It is to be noted that the depth of the recesses in the record carrier should preferably selected so that the two read systems operate in an optimum manner. In the case of a record carrier which reflects the beam of radiation, said depth will for example be the eighth part of the wavelength of the light that is used. However, a different choice is equally possible.

What is claimed is:

1. In an apparatus for reading an optically encoded disc-shaped record carrier having information provided thereon in the form of parallel extending tracks, the apparatus comprising a radiation source for optically scanning said tracks, a multi-element photoelectric detector unit provided with two read detectors offset relative to each other in a direction parallel to an image of the track direction formed by the use of said radiation source for converting the image into electrical signals, and a first combination circuit connected to said two read detectors for provided a first signal channel of the information read from said carrier, the improvement comprising a second combination circuit connected to said two read detectors for adding the electrical signals therefrom and for providing a second signal channel of said information read from said carrier, and filter means connected to said first combination circuit and said second combination circuit for deriving from said first combination circuit that portion of said first signal channel of the information read from said carrier that exceeds a predetermined frequency and for deriving from said second combination circuit that portion of the second signal channel of said information read from said carrier that is below said predetermined frequency.

2. An apparatus as claimed in claim 1, wherein the first signal processing channel is equipped to process the luminance information of a color television signal which is recorded on the record carrier, which luminance information is recorded as a frequency modulation of a first carrier wave in said part of the frequency spectrum of comparatively high frequency, while the second signal processing channel is equipped to process at least the chrominance information of said color television signal, which chrominance information is recorded as a modulation of a second carrier wave in the said part of the frequency spectrum of comparatively low frequency.

3. An apparatus as claimed in claim 1, wherein the two read detectors form part of a detector unit which comprises four read detectors, which are disposed symmetrically relative to an imaginary orthogonal system of axes.

4. An apparatus as claimed in claim 3, wherein the first signal processing channel is equipped to process the luminance information of a color television signal which is recorded on the record carrier, which luminance information is recorded as a frequency modulation of a first carrier wave in said part of the frequency spectrum of comparatively high frequency, while the second signal processing channel is equipped to process at least the chrominance information of said color television signal, which chrominance information is recorded as a modulation of a second carrier wave in the said part of the frequency spectrum of comparatively low frequency.

* * * * *

UNITED STATES PATENT AND TRADEMARK OFFICE
CERTIFICATE OF CORRECTION

PATENT NO. : 3,962,721

DATED : June 8, 1976

INVENTOR(S) : MAARTEN RUTGER DE HAAN

It is certified that error appears in the above-identified patent and that said Letters Patent are hereby corrected as shown below:

<u>IN THE SPECIFICATION</u>

Col. 3, line 54, "5" should be --S--;

Col. 5, line 32, "3.6 - 30 = 0.6 MHz." should be --3.6 - 3 = 0.6 MHz.--;

line 66, "supplied" should be --applied--;

Signed and Sealed this

Twenty-first Day of September 1976

[SEAL]

Attest:

RUTH C. MASON
*Attesting Officer*

C. MARSHALL DANN
*Commissioner of Patents and Trademarks*